(12) United States Patent
Haidar

(10) Patent No.: US 10,815,965 B2
(45) Date of Patent: Oct. 27, 2020

(54) MULTI-PISTON BLADELESS WIND TURBINE

(71) Applicant: KING SAUD UNIVERSITY, Riyadh (SA)

(72) Inventor: Zeyad Abdulwahid Ghaleb Haidar, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 16/776,489

(22) Filed: Jan. 29, 2020

(65) Prior Publication Data
US 2020/0263659 A1 Aug. 20, 2020

Related U.S. Application Data

(63) Continuation-in-part of application No. 16/276,509, filed on Feb. 14, 2019.

(51) Int. Cl.
*F03D 5/06* (2006.01)
*F03D 9/17* (2016.01)
(Continued)

(52) U.S. Cl.
CPC ............... *F03D 5/06* (2013.01); *F03D 9/17* (2016.05); *F03D 9/25* (2016.05); *F03D 9/28* (2016.05);
(Continued)

(58) Field of Classification Search
CPC ... F03D 5/005; F03D 5/04; F03D 9/28; F05B 2260/406
See application file for complete search history.

(56) References Cited

U.S. PATENT DOCUMENTS 122,930 A * 1/1872 Atwater ................ F03B 13/266
  417/336
648,442 A * 5/1900 Scott ...................... F03D 3/002
  415/4.1
(Continued)

FOREIGN PATENT DOCUMENTS

CN 106523288 A 3/2017
CN 106930897 A 7/2017
(Continued)

OTHER PUBLICATIONS

U.S. Appl. No. 16/276,509, US Application (Year: 2019).*
(Continued)

*Primary Examiner* — Michael Leslie
*Assistant Examiner* — Matthew Wiblin
(74) *Attorney, Agent, or Firm* — Nath, Goldberg & Meyer; Richard C. Litman

(57) ABSTRACT

The multi-piston bladeless wind turbine creates electrical energy using hydraulically connected pistons. The system may include a disk, a small piston in fluid communication with a large piston, and a crankshaft attached to the large piston. The disk transfers forces from the wind to the small piston. Hydraulic fluid then transfers the forces to the larger piston. When the disk and associated small piston have been forced to the end of their stroke by the wind, a gate in the disk is opened to reduce wind force on the disk by allowing air to travel through the disk. Subsequently, the disk and associated small piston are pushed back to the beginning of the stroke by the pressure created by the large piston's weight. This process is repeated by closing the gate in the disk. A crankshaft powering an electric generator is turned by the movement of the large piston.

11 Claims, 13 Drawing Sheets

(51) Int. Cl.
*H02N 2/18* (2006.01)
*H02K 7/18* (2006.01)
*F03D 9/25* (2016.01)
*F03D 9/28* (2016.01)

(52) U.S. Cl.
CPC ...... *F05B 2260/406* (2013.01); *H02K 7/1892* (2013.01); *H02N 2/185* (2013.01)

(56) References Cited

U.S. PATENT DOCUMENTS

| | | | | |
|---|---|---|---|---|
| 4,238,171 | A * | 12/1980 | Van Mechelen | F03D 5/04 415/4.1 |
| 7,504,741 | B2 * | 3/2009 | Wrage | F03D 5/00 290/55 |
| 7,626,281 | B2 | 12/2009 | Kawai | |
| 7,989,973 | B2 * | 8/2011 | Birkestrand | E02B 9/00 290/44 |
| 8,067,878 | B1 | 11/2011 | Lu et al. | |
| 2011/0030361 | A1 | 2/2011 | Gopalswamy et al. | |
| 2012/0096845 | A1 * | 4/2012 | Ingersoll | F04B 41/02 60/408 |
| 2013/0257049 | A1 * | 10/2013 | Taylor | H02P 9/006 290/43 |
| 2015/0308410 | A1 | 10/2015 | Goldstein | |
| 2017/0002789 | A1 * | 1/2017 | Nair | F03C 1/00 |
| 2017/0108238 | A1 * | 4/2017 | McMahon | F24F 12/00 |
| 2017/0268483 | A1 | 9/2017 | Kim et al. | |
| 2018/0094617 | A1 * | 4/2018 | Neifeld | F03C 1/047 |

FOREIGN PATENT DOCUMENTS

| | | | | |
|---|---|---|---|---|
| CN | 107061170 | A | | 8/2017 |
| GB | 2538984 | A | | 12/2016 |
| GB | 2542205 | A * | 3/2017 | ............... F03D 5/00 |
| KR | 20100070266 | A | | 6/2010 |
| KR | 101049217 | B1 | | 7/2011 |

OTHER PUBLICATIONS

Smalley, "SheerWind's INVELOX funnel-based wind power technology is bird safe", Windpower Engineering & Development, Jul. 23, 2015.

* cited by examiner

MULTI-PISTON BLADELESS WIND TURBINE

CROSS-REFERENCE TO RELATED APPLICATION

This application is a continuation-in-part of U.S. patent application Ser. No. 16/276,509, filed on Feb. 14, 2019.

BACKGROUND

1. Field

The disclosure of the present patent application relates to wind power generation, and particularly to a multi-piston bladeless wind turbine having a disk driven to reciprocate by the wind coupled to a hydraulic power amplification system that may be coupled to a crankshaft or linkage to convert reciprocating motion to rotary motion to drive the shaft of a turbine or an electrical generator.

2. Description of the Related Art

Wind turbines are used throughout the world as a way to harness renewable energy for a relatively inexpensive price. Despite their advantages, such as renewable energy, there are some disadvantages that need to be addressed. Wind turbines may kill birds, they are noisy, have high costs of construction and maintenance due to of the position of generators and gears at an elevated position, need a large area is needed to build a wind farm, and excess wind speed causes problems on mechanical and electrical components.

Wind turbines fall into two main categories, including vertical-axis and horizontal-axis wind turbines. Horizontal wind turbines include multiple large blades that extend radially outward from a central axis in a plane horizontal to the wind. When wind passes the blades, the blades cause rotation of the axis. In addition to rotator noise and bird collisions, horizontal wind turbines require mechanically complicated elements, such as a bevel gear for yawing, that must be disposed within the hub in order to handle a change in the direction of the wind.

Vertical turbines may include blades that are offset from a central axis and extend substantially parallel to their axis of rotation, which is perpendicular to the wind direction. The vertical wind-type generation system is different from the horizontal type in that the bevel gear for yawing is generally not required. However, the vertical-axis wind turbine suffers from many of the same disadvantages of the horizontal-axis wind turbines.

Accordingly, many researchers have attempted to design and fabricate a multi-piston bladeless wind turbine to avoid these disadvantages. Multi-piston bladeless wind turbines have been conceived, but they often suffer from lack of efficiency and durability when compared to bladed wind turbines. Thus, a multi-piston bladeless wind turbine solving the aforementioned problems is desired.

SUMMARY

The multi-piston bladeless wind turbine creates electrical energy using hydraulically communicating pistons. The system includes a wind disk, a small piston in fluid communication with a large piston, and a crankshaft attached to the large piston. The wind disk is used to collect wind force and transfer the force to the small piston. A hydraulic fluid system transfers the force of the small piston to a larger piston. When the wind disk and associated small piston have been forced to the end of their stroke by the wind, a gate in the disk is opened to reduce wind force on the disk by allowing air to travel through the disk. Due to less wind force as a result of the open gate, the disk and associated small piston are pushed back to the beginning of the stroke by the pressure created by the large piston's weight (potential energy of large piston). This process is repeated by closing the gate in the disk. The large piston is attached to a crankshaft, which turns the linear movement of the large piston into rotational movement, which is applied to an electric power generator.

In an alternative embodiment, the multi-piston bladeless wind turbine, similar to the previous embodiment, includes a sealed hydraulic system, but the sealed hydraulic system includes a plurality of input cylinders, an output cylinder, and a conduit extending between the plurality of input cylinders and the output cylinder. The input cylinders are in fluid communication with one another and also with the conduit. Each of the input cylinders has a corresponding input piston constrained to reciprocate in and seal the cylinder. Each input piston has an input shaft extending therefrom out of the corresponding input cylinder. As in the previous embodiment, an output piston is constrained to reciprocate in and seal the output cylinder, the output piston having an output shaft extending therefrom out of the output cylinder. Hydraulic fluid is disposed between each of the input pistons and the output piston; i.e., the hydraulic fluid fills the sealed system within each of the input cylinders, the conduit and the output cylinder.

The wind disk is attached to each of the input shafts and, similar to the previous embodiment, the wind disk has a relief valve selectively switchable between a closed position, in which full wind pressure is exerted against each of the input shafts, and an open position, in which at least some of the wind pressure is bled to the outside atmosphere. A sensor control system is connected to the relief valve for switching the relief valve between the open and closed positions in response to sensor signals relating to the position of at least one of the input pistons and the output piston to maintain reciprocation of the input pistons and the output piston. The wind pressure against the wind disk is converted to mechanical power by reciprocation of the output shaft of the output piston.

In a further alternative embodiment, the sealed hydraulic system of the multi-piston bladeless wind turbine is formed from an input cylinder, a plurality of output cylinders, and a conduit extending between the input cylinder and the output cylinders. As in the previous embodiments, an input piston is constrained to reciprocate in and seal the input cylinder. The input piston has an input shaft extending therefrom and out of the input cylinder. Each of the output cylinders has a corresponding output piston constrained to reciprocate in and seal the cylinder. Each output piston has an output shaft extending therefrom and out of the corresponding output cylinder. It should be understood that the plurality of output cylinders and output pistons may be used in combination with either the single input cylinder and piston embodiment, as described above, or the previous multiple input cylinder and piston embodiment.

As in the previous embodiments, hydraulic fluid is disposed between the input piston and each of the output pistons. The wind disk is attached to the input shaft, and, as in the previous embodiments, the wind disk has a relief valve selectively switchable between a closed position in which full wind pressure is exerted against the input shaft, and an open position in which at least some of the wind pressure is bled to the outside atmosphere. The sensor control system is connected to the relief valve for switching the relief valve between the open and closed positions in response to sensor signals relating to the position of the input piston and each output piston to maintain reciprocation of the input piston and the plurality of output pistons. As in the previous embodiments, the wind pressure against the wind disk is converted to mechanical power by reciprocation of the output shafts of the output pistons. Also, a plurality of flow valves may be provided for selectively controlling flow of the hydraulic fluid between the conduit and the plurality of output cylinders. In any of the above embodiments, a small wind turbine generator may be mounted behind the relief valve, such that when the relief valve is in the open position, the small wind turbine generator is driven to produce electrical current, rather than simply bleeding the wind to the atmosphere.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The multi-piston bladeless wind turbine creates electrical energy using hydraulically communicating pistons. In some embodiments, the system includes a wind disk, a small piston in fluid communication with a large piston, and a crankshaft attached to the large piston. The wind disk is used to collect wind force and transfer the force to the small piston. A hydraulic fluid system transfers the force of the small piston to a larger piston. When the wind disk and associated small piston have been forced to the end of their stroke by the wind, a gate in the disk is opened to reduce wind force on the disk by allowing air to travel through the disk. Due to less wind force as a result of the open gate, the disk and associated small piston are pushed back to the beginning of the stroke by the pressure created by the large piston's weight (potential energy of large piston). This process is repeated by closing the gate in the disk. The large piston is attached to a crankshaft, which turns the linear movement of the large piston into rotational movement, which is applied to an electric power generator.

Figure 1:
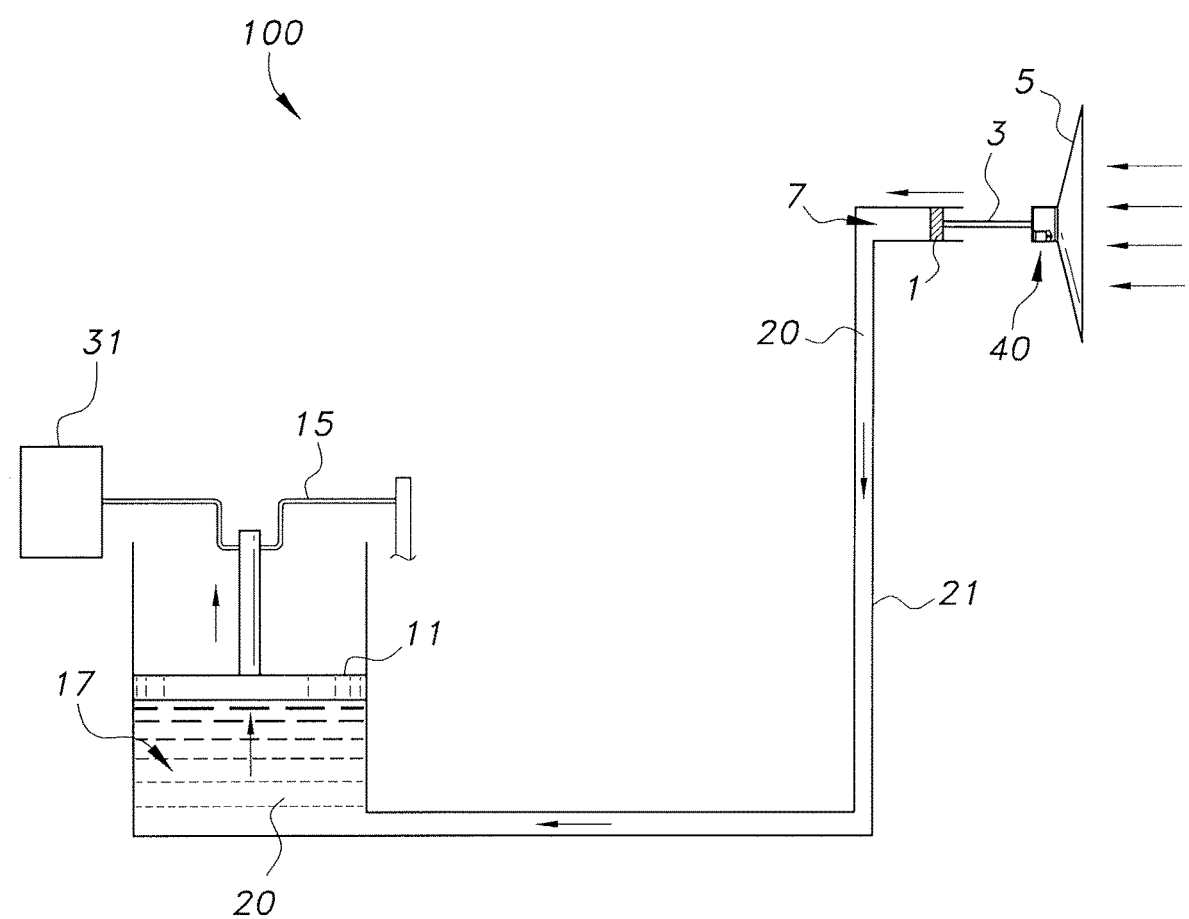
FIG. 1 is a diagrammatic side view of an embodiment of the multi-piston bladeless wind turbine at the beginning of the forward stroke of the wind-driven piston.

FIG. 1 shows the multi-piston bladeless wind turbine 100 at the beginning of a forward stroke of the wind-driven piston 1 and shaft 3. A stroke is defined as the complete range of motion of a piston. At the beginning of the forward stroke, the small piston 1 is at an outer end of a small cylindrical bore 7. In this position, the bore 7 is filled with hydraulic fluid 20 that is in communication with the large piston 11 through a conduit 21 that fills a reservoir in which the large piston is seated.

The disk 5 is attached to the small wind-driven piston 1 through an elongate shaft 3 having a length greater than that of the small piston stroke and a diameter less than that of the small piston bore 7. When a wind force $F_w$ great enough to move the small piston 1 is applied to the disk 5, the small piston 1 is pushed through the bore 7 until it reaches the end of the stroke. A fluid tight seal is created between the small piston 1 and the small piston bore 7. Therefore, by moving through the stroke, the small piston 1 pushes the hydraulic fluid out of the small piston bore 7. The movement of either piston 1, 11 from the beginning of the forward stroke to the end of the forward stroke will be referred to as the first half-cycle.

The small piston bore 7 is in fluid communication with a vertically oriented reservoir 17 through a conduit 21. The large piston 11 is seated in the reservoir 17 with a fluid tight seal between the large piston 11 and the wall of the reservoir 17. Therefore, pushing the fluid out of the small piston bore 7 results in fluid being pushed into the reservoir 17, and the large piston 11 being raised or moving upward to gain potential energy, and also rotate the crankshaft 15.

Figure 2:
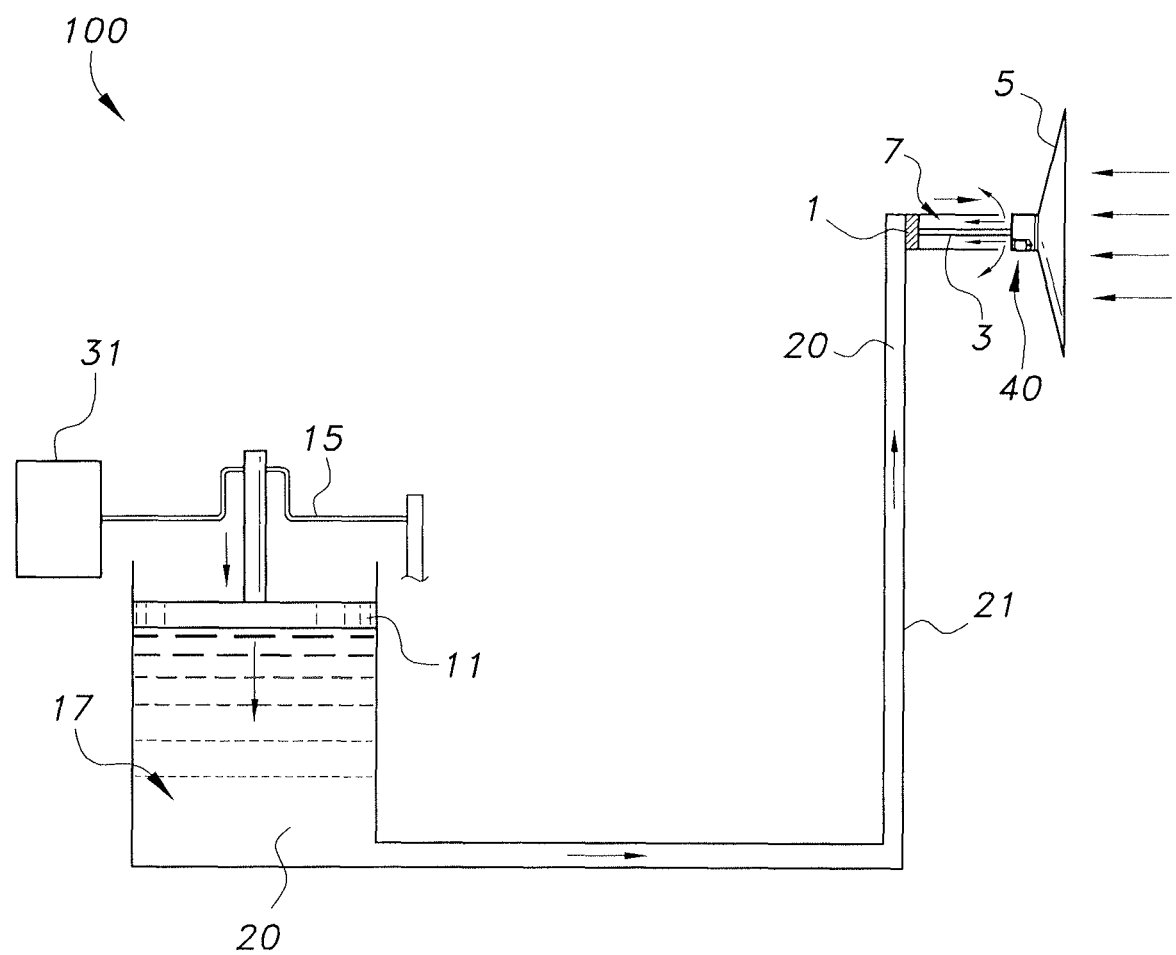
FIG. 2 is a diagrammatic side view of the multi-piston bladeless wind turbine of FIG. 1 at the end of the forward stroke of the wind-driven piston.

Once the small piston 1, and simultaneously the large piston 11, have been pushed to the end of their foreword strokes, a gate mechanism 40 in the disk 5 is opened, which allows wind to flow through the disk 5 and be vented to the atmosphere in the gap between the rear of the disk 5 and the small piston bore 7. FIG. 2 shows the pistons 1, 11 at the ends of their strokes. By allowing wind to flow through the disk 5, instead of pushing against the disk 5, the wind force $F_w$ on the disk 5 and applied to the small piston 1 is reduced. This will allow the potential energy of the large piston 11 to push down the hydraulic fluid 20 in the reservoir 17 and back through the conduit 21 to bear against the small piston 1, thus pushing the small piston 1 back in the bore 7 to the beginning of the forward stroke so the process may be repeated. The movement of either piston 1, 11 from the end of the forward stroke to the beginning of the forward stroke will be referred to as the second half-cycle.

The movement of the pistons 1, 11 is based on Pascal's law. Pascal's law states that for an incompressible fluid, a change in pressure anywhere in the fluid is transmitted throughout the fluid such that the change occurs everywhere. Therefore, the force on the fluid 20 from the small piston 1 causes the fluid pressure to increase. The increase in fluid pressure then causes the large piston 11 to move. The same principle applies in the opposite direction when the weight of the piston 11 bears against the fluid 20 in the reservoir 17. A hydraulic fluid will be used as the fluid that transmits the pressure and can be considered substantially incompressible. High quality hydraulic fluids, which are more difficult to compress, will result in a more efficient device, since less energy will be wasted on compressing the fluid 20. Pascal's law can be described in the following equation (1):

$$\frac{f_1}{A_1} = \frac{f_2}{A_2}, \quad (1)$$

where f=is the force acting on the piston and A=cross-sectional area contacting the fluid. Accordingly, a small force enacted on the small piston 1 will translate to a large force on the large piston 11 at the magnification of large piston area/small piston area. However, a distance moved by the pistons 1, 11 will have an inverse relationship. A large distance moved by the small piston 1 will cause the large piston 11 to move a short distance. Factors that can affect the piston size relationship include the force created by the wind $F_w$ (determined by disk size and wind speed), the stroke length of the pistons 1, 11, and the force required to drive the generator 31. In addition, the weight of the large piston 11 will have to be properly calibrated to provide just enough force on the small piston 1 to push it back to the beginning of the stroke. Efficiency of the system can be increased by optimizing the large piston's weight so wind force is not wasted pushing up unnecessary large piston weight.

The ratio of the piston sizes 1, 11 can be determined based on the two forces acting on the system 100. The variable force is wind force $F_w$, which is applied to the small piston 1. This force varies because it is based on wind speed, which is an uncontrolled variable. Wind force $F_w$ can be calculated using the following equation (2):

$$F_w = 0.5 * \rho * v^2 * A * C_d, \quad (2)$$

where $F_w$ is wind force in Newtons, A is surface area in meters squared, p is air density in kg/m³, v is wind speed in meters per second, and $C_d$ is a drag coefficient having a value between 1 and 2. The controlled variable is the force caused by the size and weight of the large piston 11. This variable is determined based on the amount of power intended to be extracted, which will be determined based on the predicted wind force.

The cycle frequency of a system 100 will be a variable of wind force $F_w$, but can be optimized by adjusting the piston size ratio and the weight of the large piston 11. Increasing the weight of the large piston 11, decreasing the area of the large piston 11, or increasing the area of the small piston 1 will slow down the first half-cycle, since a larger wind force $F_w$ will be required to push up the large piston 11. However, these adjustments will increase the speed of the second half-cycle, since the force created by the large piston 11 to reset the small piston 1 to the beginning of the forward stroke will be larger. The opposite will happen by increasing the area of the large piston 11, decreasing the weight of the large piston 11, and decreasing the area of the small piston 1, which will allow for optimization of the system based on the predicted wind force $F_w$. However, wind force $F_w$ is an uncontrolled variable, and the system can only be optimized for a predicted average wind speed.

The cycle frequency of the multi-piston bladeless wind turbine 100 can also be adjusted through use of the gate mechanism. In cases where the wind speed is at the predicted average or below, the gate mechanism 40 can be left completely closed to maximize the force of the wind on the disk 5. A wind speed above the predicted average may cause the turbine to operate at a frequency higher than intended, which may result in damage. In these high wind speed cases, the gate mechanism 40 may be partially opened during the first half-cycle to reduce the wind force acting on the turbine, thus reducing the cycle frequency. The size of the opening created by the gate mechanism 40 can be increased for increased wind speeds to keep the wind force and associated reciprocating frequency constant.

Figure 3:
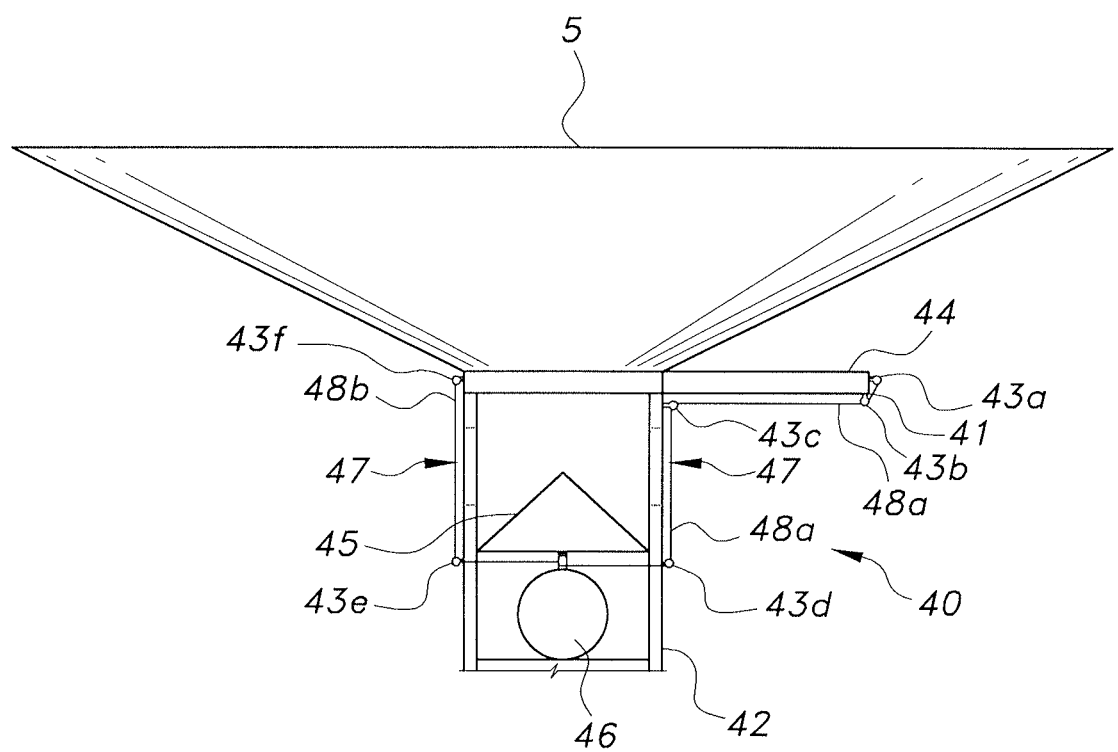
FIG. 3 is a diagrammatic top view of the wind disk and gate mechanism of the multi-piston bladeless wind turbine of FIG. 1.
Figure 7:
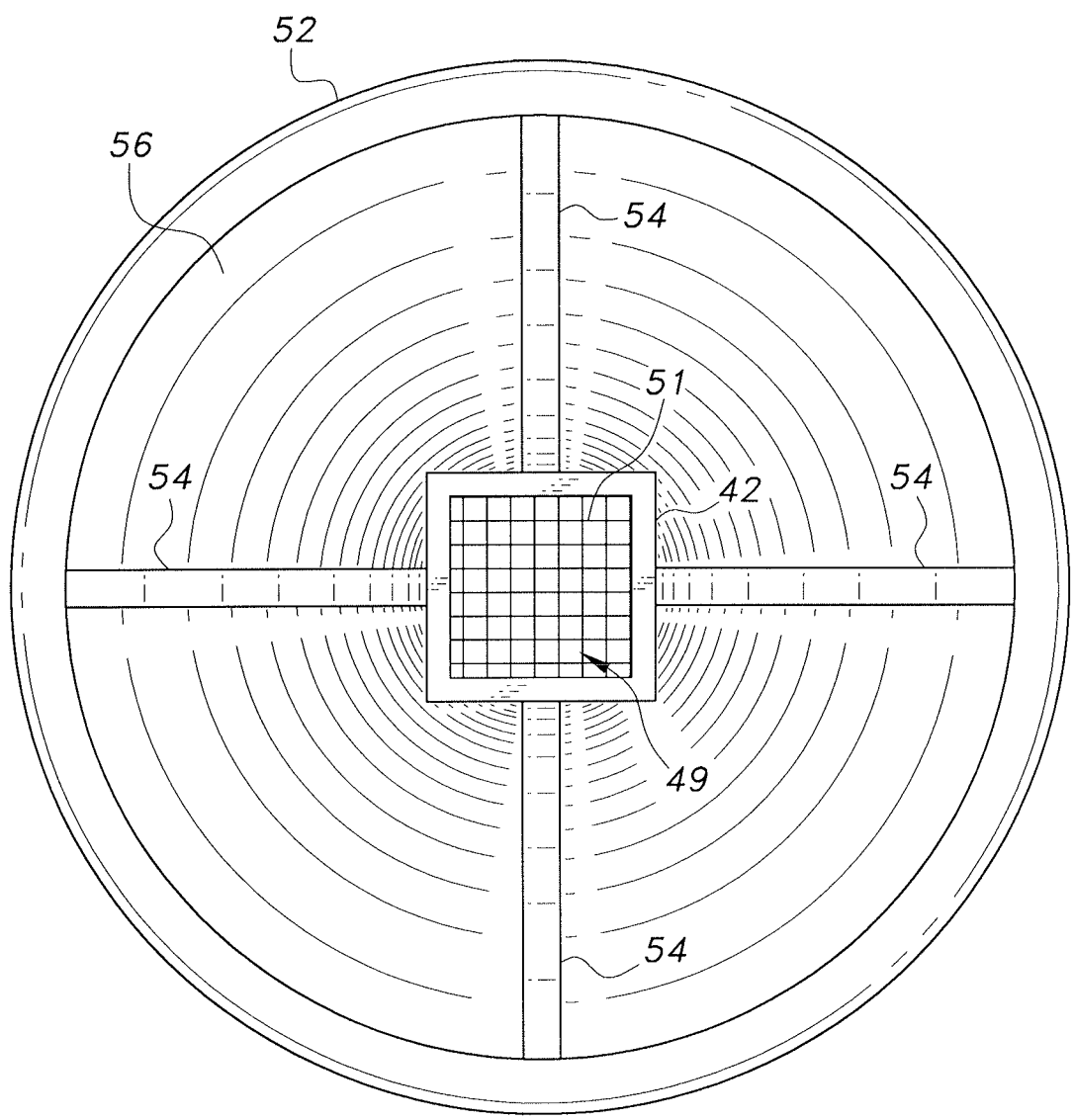
FIG. 7 is a front view of an alternative embodiment of the wind disk of FIG. 5.
Figure 10:
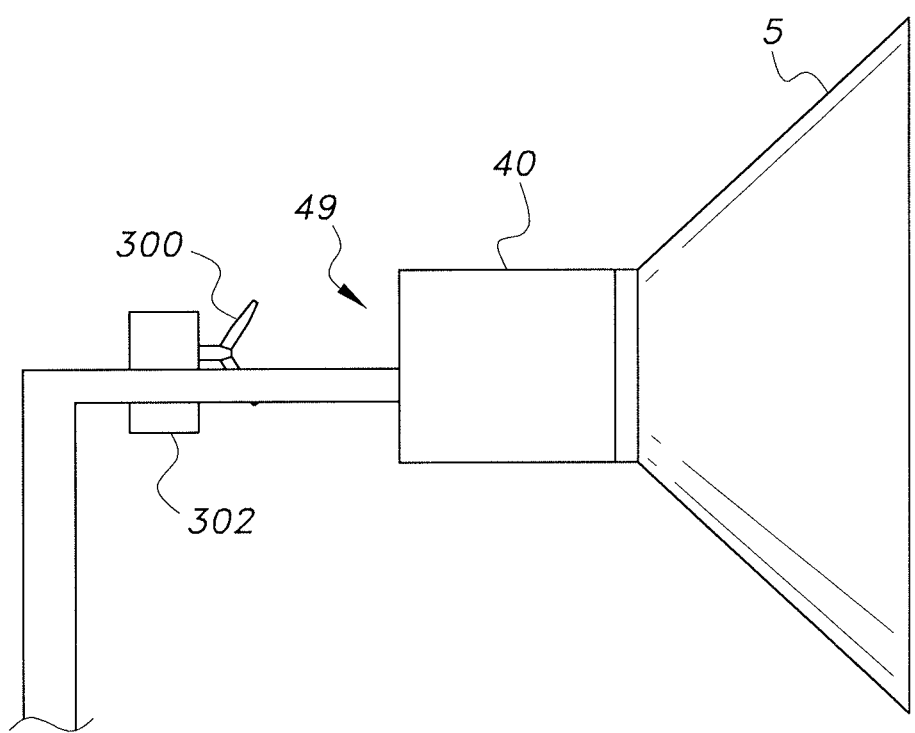
FIG. 10 is a diagrammatic partial side view of another alternative embodiment of a multi-piston bladeless wind turbine.

FIG. 3 shows a diagrammatic top view of the disk 5 and associated gate mechanism 40. The gate mechanism 40 includes a housing 42, a sliding door 44, a motor 46, and a wire linkage 48a, 48b between the motor 46 and the sliding door 44. The sliding door 44 is attached to the front of the housing 42, which is mounted on the back of the disk 5 at its center. When the gate mechanism 40 is in the closed position, which occurs during the first half-cycle, the sliding door 44 will be positioned in the center of the disk 5 and will allow minimal or no wind to pass through the opening 49 in the center of the disk 5. Therefore, the wind force acting on the disk 5 will be maximized. When the small piston 1 reaches the end of its forward stroke, the gate mechanism 40 is opened by sliding the door 44 out of the housing 42, as seen in FIG. 3. This creates an opening (not shown in the figure) in the center of the disk 5 for wind to pass through, thus reducing the wind force on the disk 5. Thus, the gate mechanism operates as a valve. Openings 47 in the side of the housing 42 allow wind to pass through the housing 42, while applying only minimal force to the first piston 1. A cone 45 may be placed in the back of the housing 42 to direct the wind out of the openings in the housing and help prevent turbulent flow. Further, as shown in FIG. 7, a mesh screen 51, net or the like may cover opening 49 to prevent the passage of birds, insects, debris and the like therethrough. Additionally, as shown in FIG. 10, a small wind turbine 300, which may be connected directly to a small electrical generator 302, may be mounted behind opening 49 without any mechanical transmission system. Thus, when opening 49 is uncovered, the wind passing therethrough may be used to drive the small wind turbine 300 to generate electricity.

A small motor 46, located in the back of the housing 42, moves the sliding door 44 from the open to the closed position using wires 48a, 48b and pulleys 43a-43d. As seen in FIG. 3, an extension member 41 having the length of the door 44 extends out from the side of the housing 42 in the direction that the door 44 slides. A wire 48a attached to the door 44 at one end and to the motor 46 at the other end is fed through four pulleys 43a, 43b, 43c, and 43d to guide the wire 48a between the two. The first pulley 43a is at the end of the extension member 41, which provides a location removed from the housing 42 that can be used to pull out the door 44. Pulley 43b is close to the pulley 43a to guide the wire 48a at the corner of the extension member 41. Pulleys 43c and 43d are provided to guide the wire 48a around the corners of the housing 42. A second wire 48b extends away from the motor 46 in the opposite direction and is wound around the motor 46 output shaft in a direction opposite the first wire 48a. The second wire 48b extends through pulleys 43e and 44f and connects to the door 44 at the end opposite the first wire 48a. The second wire 48b extends through a pulley 43*f* connected to the housing 42 adjacent the leading edge of the door 44 when it is sealed shut. This pulley 43*f* provides a point from which the door 44 can be pulled closed. Therefore, when the motor 46 turns in a first direction it will reel in the first wire 48*a* and let out the second wire 48*b* to open the door. When the motor 46 is turned in the opposite direction, the second wire 48*b* will be reeled in and the first wire 48*a* will be let out to close the door. Alternatively, there may be two motors, one for opening and one for closing, with one attached to each wire. In other embodiments, connection between the door and motor may be through a track and gear, or any method known in the art for sliding a door open and closed using an electric motor.

Figure 4:
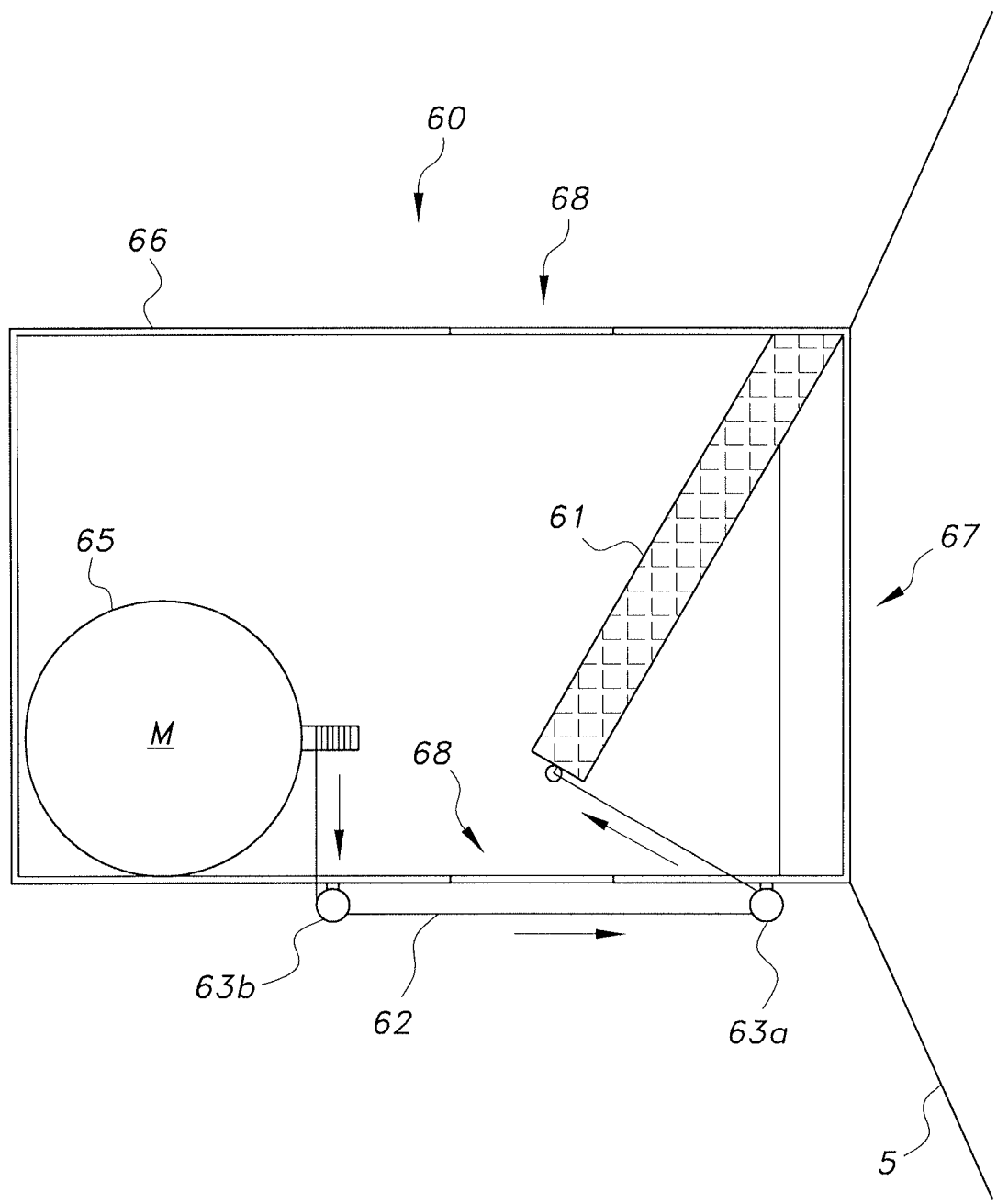
FIG. 4 is a diagrammatic top view of the wind disk and an alternate embodiment of a gate mechanism.

FIG. 4 shows a diagrammatic top view of the disk 5 and an alternate embodiment of a gate mechanism 60. The gate mechanism 60 includes a housing 66, a pivoting door 61, a motor 65, and a linkage belt 62 between the motor 65 and the pivoting door 61. One edge of pivoting door 61 is attached to the front of the housing 66 by a hinge. When the gate mechanism 60 is in the closed position, which occurs during the first half-cycle, the pivoting door 61 will be covering the opening 67 in the center of the disk 5, and will allow minimal or no wind to pass through the opening 67. Therefore, the wind force acting on the disk 5 will be maximized. When the small piston 1 reaches the end of its forward stroke, the gate mechanism 60 is opened by pivoting the door 61 into the housing 66, as seen in FIG. 4. This allows airflow through opening 67 in the center of the disk 5, thus reducing the wind force on the disk 5. Thus, the gate mechanism operates as a valve. Openings 68 in the side of the housing 66 allow wind to pass through the housing 66, while applying only minimal force to the first piston 1.

A linkage belt 62 is attached at one end to the end of the door 61 opposite the hinge, and at the opposing end to the output shaft of the motor 65. A first pulley 63*a* is mounted adjacent the opening 67 and provides a point from which the door can be pulled closed. A second pulley 63*b* guides the belt back to the motor and then transverse to the output shaft for winding and unwinding. The gate 61 is opened using the force of the wind. During the opening process, the linkage belt 62 is unwound from the output shaft of the motor 65. To close the gate 61, the motor 65 rotates to reel in the belt 62, which, in turn, pulls the gate 61 shut. A latch near the first pulley 63*a* or a brake on the output shaft of the motor 65 can be used to lock the gate 61 in a closed position to minimize energy expenditure of the motor 65.

Figure 5:
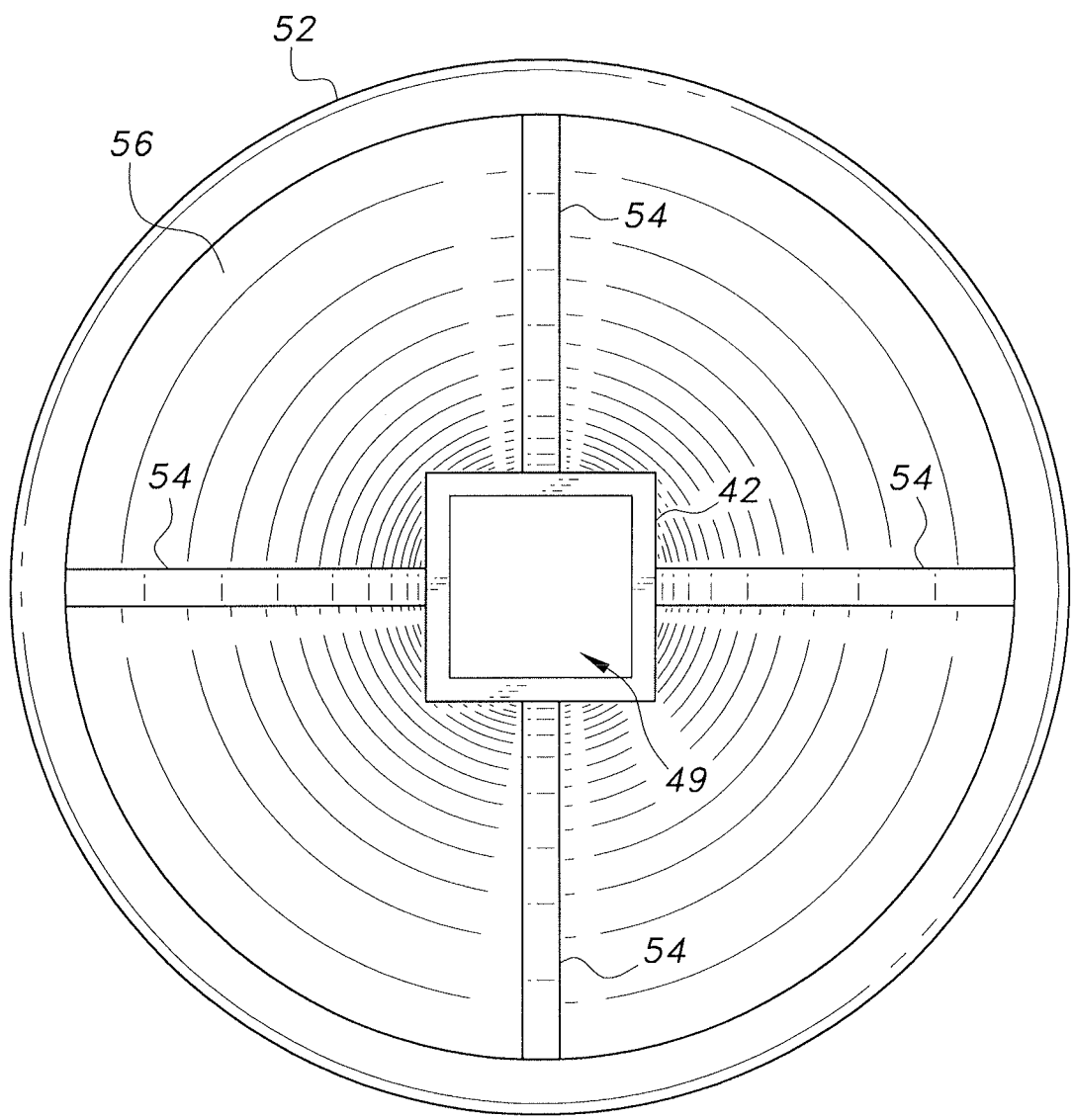
FIG. 5 is a diagrammatic front view of the wind disk of the multi-piston bladeless wind turbine of FIG. 1.
Figure 6:
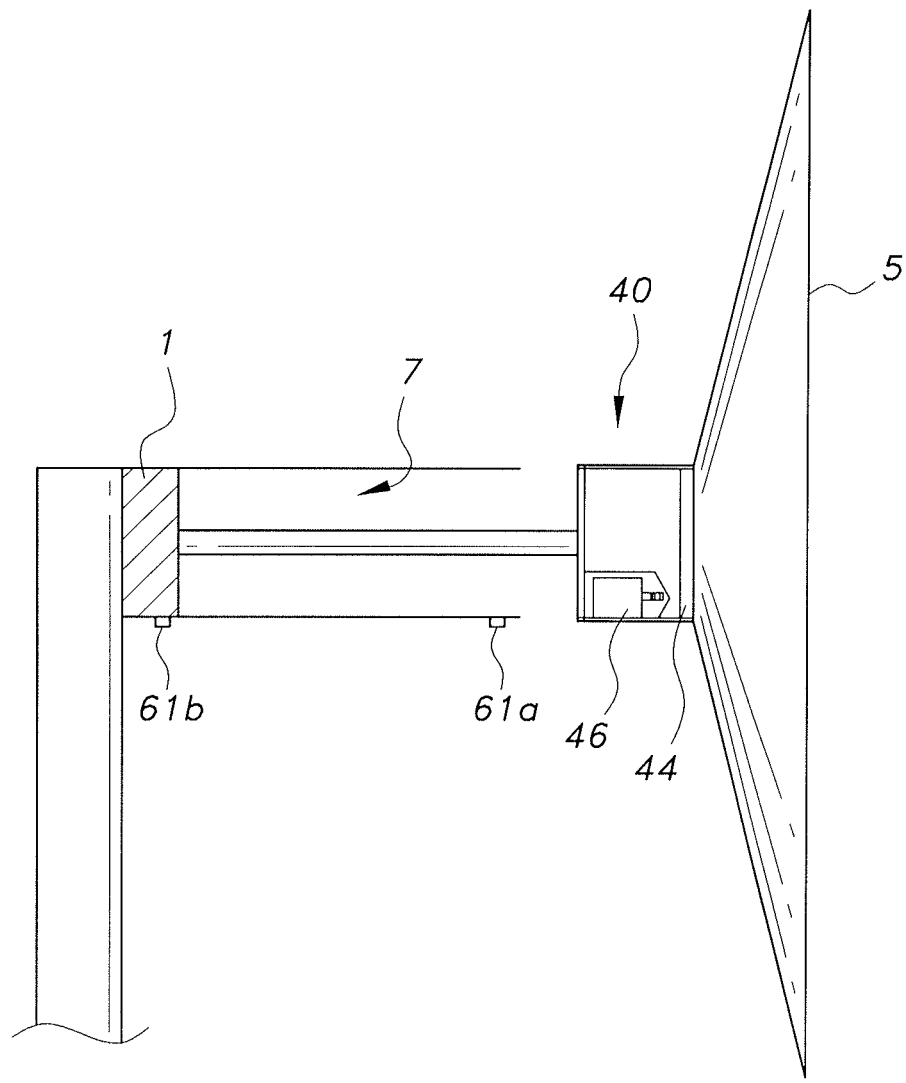
FIG. 6 is a partial view of the multi-piston bladeless wind turbine of FIG. 1, largely schematic, showing details of the wind disk and wind-driven piston.

FIG. 5 shows a front view of the wind disk 5. The structure of the disk 5 is provided by an outer metallic ring 52 connected to the gate mechanism housing 42 by radial members 54. A sail material 56 is attached to the outer ring 52 and radial members 54 to create a surface for collecting the wind force. Accordingly, an air-tight seal may be created between the outer ring 52, the radial members 54, and the gate mechanism housing 42 by the sail material 56. The sail material 56 may be selected based on strength and weight. In a preferred embodiment, the sail material 56 will be of a minimal weight while retaining enough strength to prevent breakage due to wind forces. In addition, the sail material 56 will have high tear and adhesion strength, high resistance to a large range of temperatures, and high durability. Exemplary sail material 56 includes aluminum, steel, PVC coated fabrics, and tensile tent fabrics. The horizontal cross-section of the disk 5 may be shaped as a triangle, as shown in FIGS. 3 and 6, being a truncated cone having a recessed pocket for better containment of wind forces. Alternatively, the rear edges creating the recess may have an arcuate shape. In some embodiments, the disk 5 may be shaped as a truncated hollow prism. The opening 49 created by the gate mechanism housing 42 is shown as having a square cross section. However, it may also be shaped as a rectangle, circle, ellipse, or other open shapes, depending on the use scenario.

FIG. 6 shows a diagrammatic side view of the wind disk 5, small piston 1, and small piston bore 7 when at the end of its forward stroke. Accordingly, the small piston 1 is completely inserted into the bore 7, leaving the bore 7 devoid of fluid. At this point, the motor 46 will open the door 44 of the gate mechanism 40 so that the small piston 1 can return to the beginning of its forward stroke. The motor 46 may be controlled by a series of proximity sensors 61 and a controller that detect the small piston's position in its bore 7. A first sensor 61*a* may be located at the opening of the bore 7, or at any position that can detect that the small piston 1 is at the opening of the bore 7, causing the controller to operate the motor 46 in a direction that closes the gate mechanism door 44. A second sensor 61*b*, located in the bore 7 at the end of the small piston's forward stroke, or at a position that can determine when the small piston 1 is at the end of its stroke, can tell the controller to operate the motor 46 in a direction that opens the door. Alternatively, the sensors may be placed on the output piston or crankshaft to determine when the gate mechanism door may be opened or closed. A position sensor may be used in place of the proximity sensors 61*a*, 61*b*. When using a position sensor, opening and closing of the gate mechanism door 44 can be based on preset positions. The controller may also be used to leave the gate mechanism door 44 open at times no energy is needed to prevent unnecessary forces on the multi-piston bladeless wind turbine 100. In addition, the controller may operate a brake that freezes the small piston 1 and associated disk 5 in place to prevent unnecessary wear when no power is needed. The ends of the small piston's bore 7 may each have a flange that prevents the piston from extending outside of the bore 7. The controller may be integrated with the motor 46.

A method of bladeless wind power generation includes: moving a first piston 1 in a first direction along a linear path by harnessing wind force using a sail 5; transferring the movement of the first piston 1 to a second piston 11 through a fluid conduit 21; wherein the second piston 11 rotates a crank shaft 180° when the first piston 1 moves a full stroke in the first direction; opening a gate 40 in the sail 5 to reduce the wind force and allow the first piston 1 to move in a second, opposite direction due to a force caused by the weight of the second piston 11 on the fluid conduit 21, wherein the second piston 11 rotates a crank shaft 15 180° when the first piston 1 moves a full stroke in the second direction thus completing 360° of rotation; and repeating the previous steps to created continuous rotation of the crankshaft 15. The multi-piston bladeless wind turbine may be termed a hybrid aerodynamic-hydraulic wind power generator.

Figure 8:
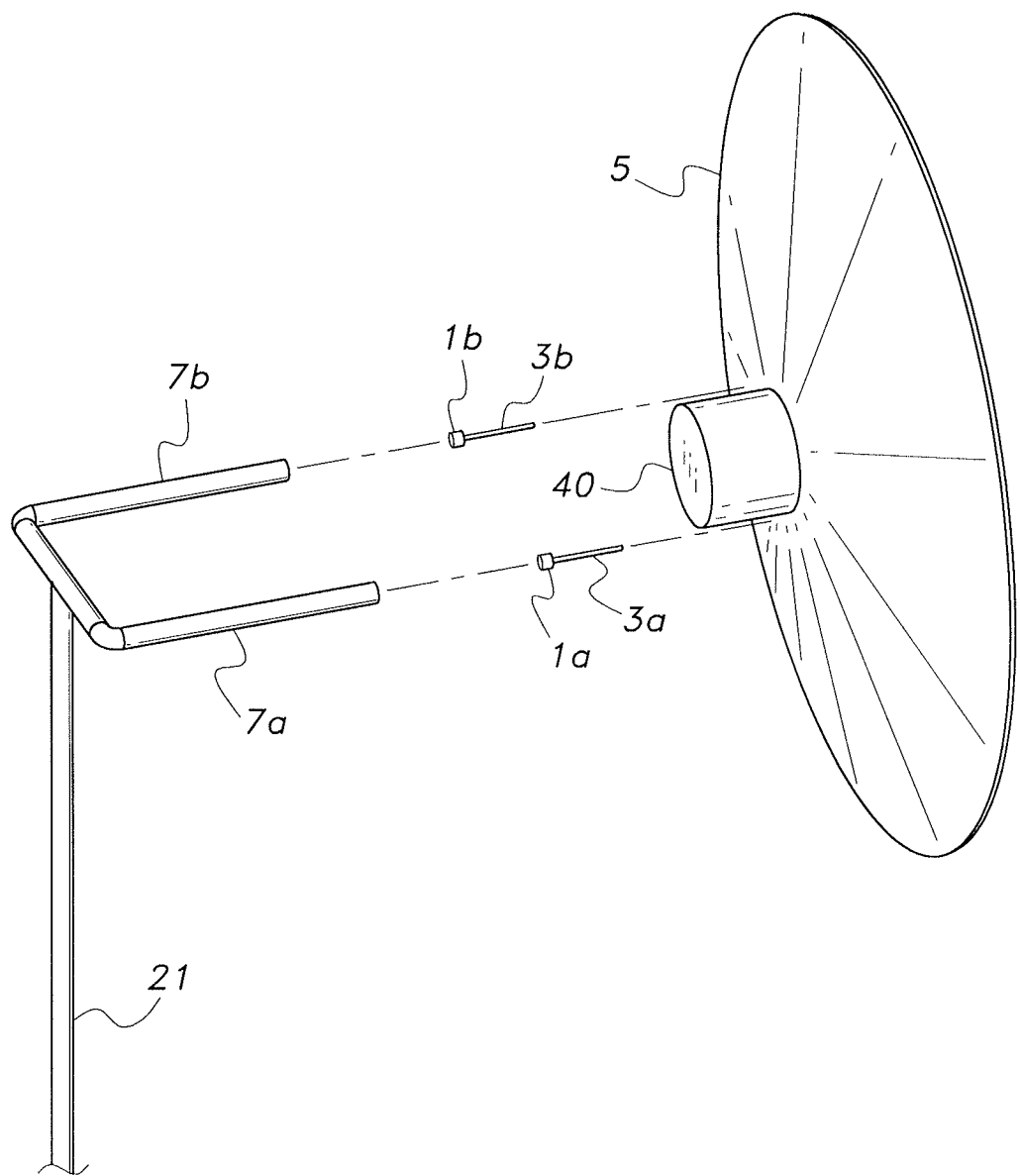
FIG. 8 is a partially exploded perspective view of the wind disk, input cylinders and input pistons of an alternative embodiment of a multi-piston bladeless wind turbine.

In the alternative embodiment shown in FIG. 8, the multi-piston bladeless wind turbine 100, similar to the previous embodiment, also includes a sealed hydraulic system, but the sealed hydraulic system includes a plurality of input cylinders 7*a*, 7*b*, as opposed to the single input cylinder 7 of the embodiment of FIG. 1. The sealed hydraulic system, other than the plurality of input cylinders 7*a*, 7*b*, remains being also defined by the output cylinder 17, or reservoir, and the conduit 21, which extends between each of input cylinders 7*a*, 7*b* and the output cylinder 17. The plurality of input cylinders 7*a*, 7*b* are in fluid communication with one another and also with the conduit 21.

For each cylinder 7*a*, 7*b*, a corresponding input piston 1*a*, 1*b* is constrained to reciprocate in and seal the cylinder 7*a*, 7b (similar to piston 1 and corresponding input cylinder 7 of the embodiment of FIG. 1). Each input piston 1a, 1b has an input shaft 3a, 3b, respectively, extending therefrom and out of the corresponding input cylinder 7a, 7b. Although only two input cylinders 7a, 7b are shown, corresponding to the two pistons 1a, 1b and their respective shafts 3a, 3b, it should be understood that any desired number of input cylinders and corresponding pistons may be used. In the dual cylinder/piston configuration of FIG. 8, the length of each input cylinder 7a, 7b is only required to be one-half that of the single input cylinder 7 of FIG. 1 in order to produce the equivalent hydraulic pressure. A similar fractioning of length applies to additional numbers of input cylinders and pistons being added to the overall system.

As in the previous embodiment, the output piston 11, as shown in FIG. 1, is constrained to reciprocate in, and seal, the output cylinder 17, and the output piston 11 has a corresponding output shaft extending therefrom and out of the output cylinder 17. Hydraulic fluid 20 is disposed between each of the input pistons 1a, 1b and the output piston 11; i.e., the hydraulic fluid 20 fills the sealed system within each of the input cylinders 7a, 7b, the conduit 21 and the output cylinder 17.

Figure 11:
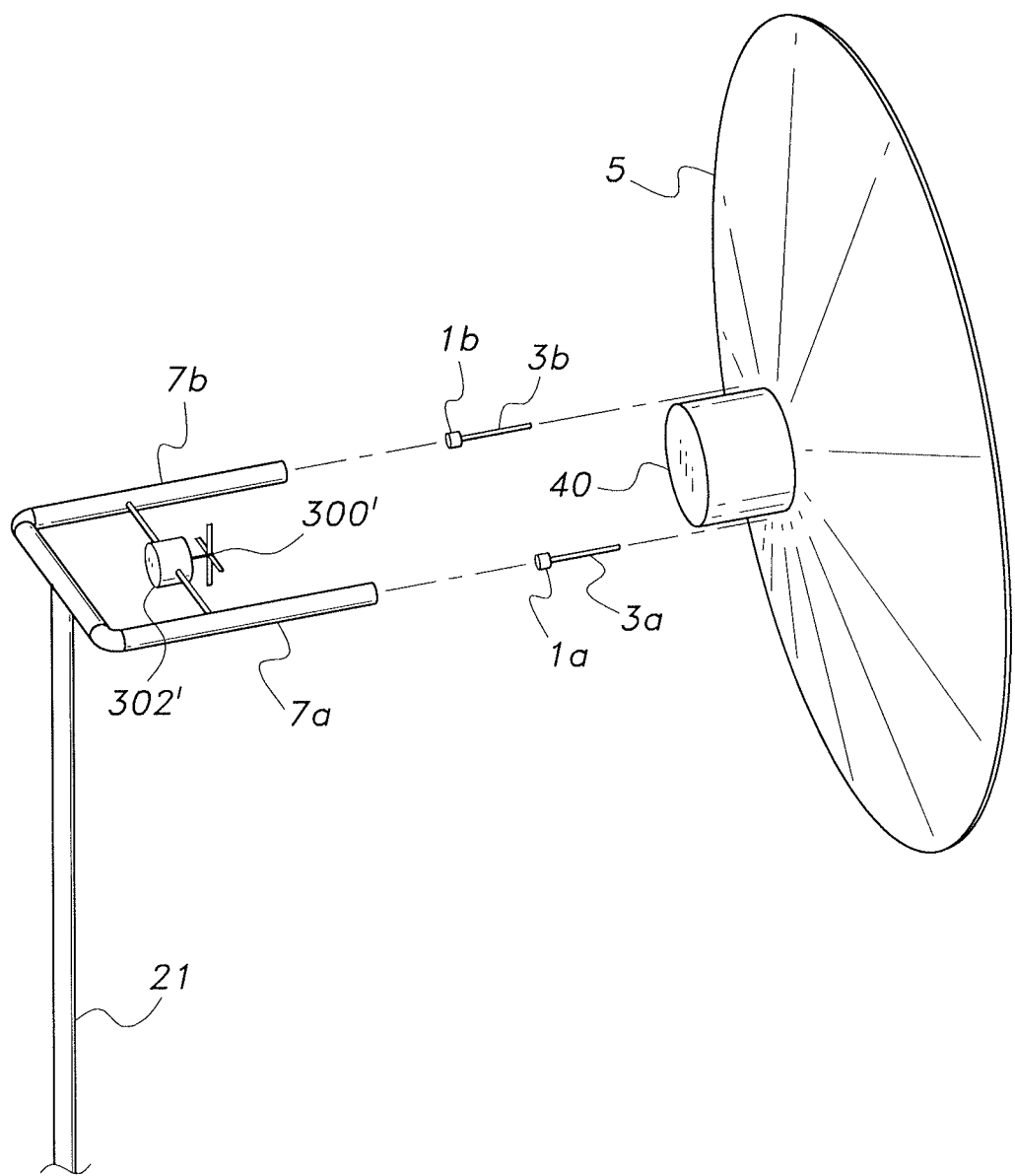
FIG. 11 is a partially exploded perspective view of an alternative embodiment of the multi-piston bladeless wind turbine of FIG. 8.

The wind disk 5, similar to that of the previous embodiment, is attached to each of the input shafts 3a, 3b, and also similar to the previous embodiment, the wind disk 5 has a relief valve 40 selectively switchable between a closed position, in which full wind pressure is exerted against each of the input shafts 3a, 3b, and an open position, in which at least some of the wind pressure is bled to the outside atmosphere. Also, as in the previous embodiment, a sensor control system, such as that described above with respect to FIG. 6 and sensors 61a, 61b, is connected to the relief valve 40 for switching the relief valve 40 between the open and closed positions in response to sensor signals relating to the position of at least one of the input pistons 1a, 1b and/or the output piston 11 to maintain reciprocation of the input pistons 1a, 1b and the output piston 11. The wind pressure against the wind disk 5 is converted to mechanical power by reciprocation of the output shaft of the output piston 11. Similar to the embodiment of FIG. 10, FIG. 11 shows a similar small wind turbine 300' (with associated generator 302') applied to the dual-piston embodiment of FIG. 8, where the wind turbine 300' and associated generator 302' are mounted between input cylinders 7a, 7b, behind relief valve 40.

Figure 9A:
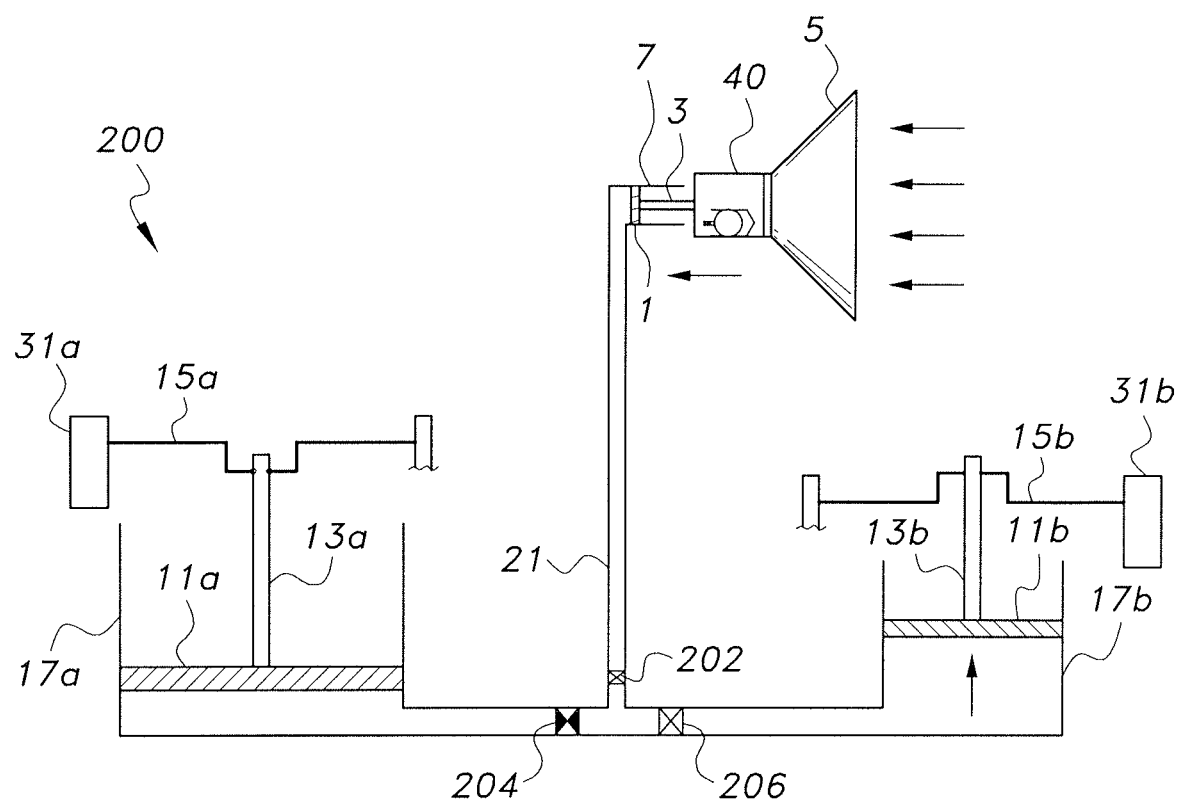
FIG. 9A is a diagrammatic side view of another alternative embodiment of a multi-piston bladeless wind turbine, shown in a first, initial stage of a stroke cycle.
Figure 9B:
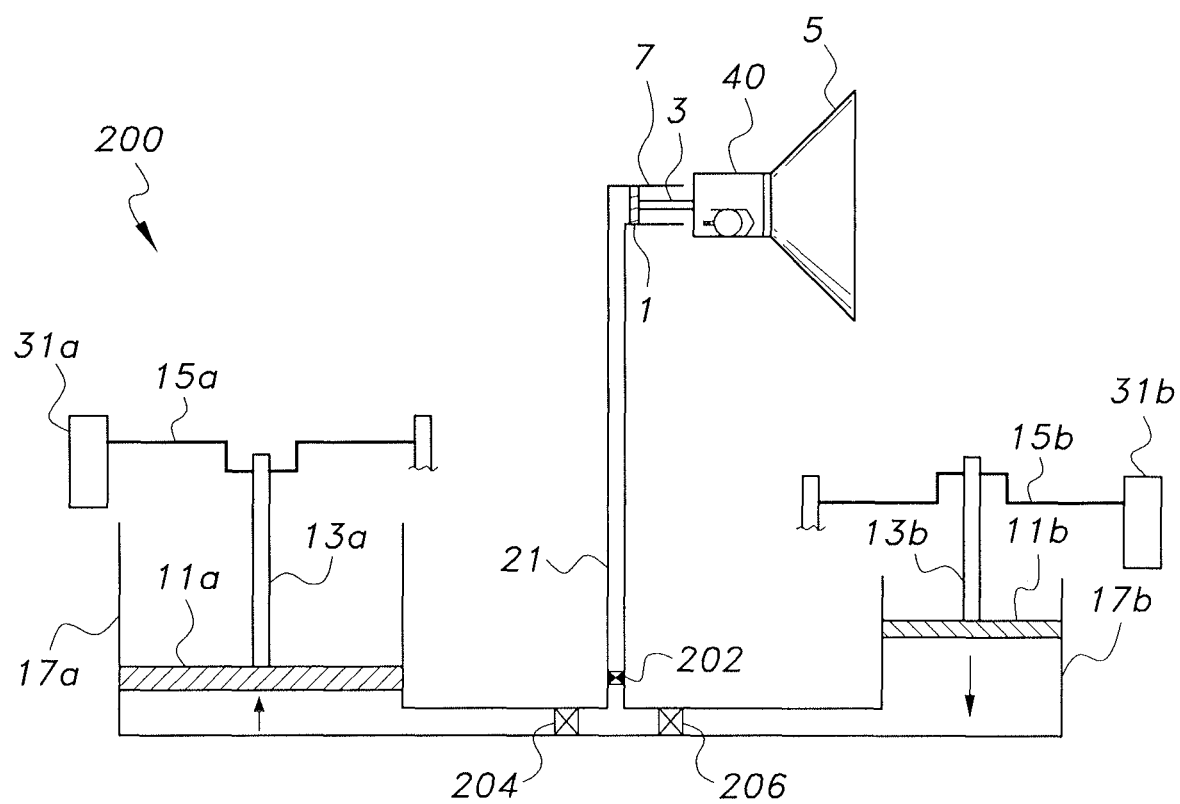
FIG. 9B is a diagrammatic side view of the multi-piston bladeless wind turbine of FIG. 9A, shown in a second stage of the stroke cycle.
Figure 9C:
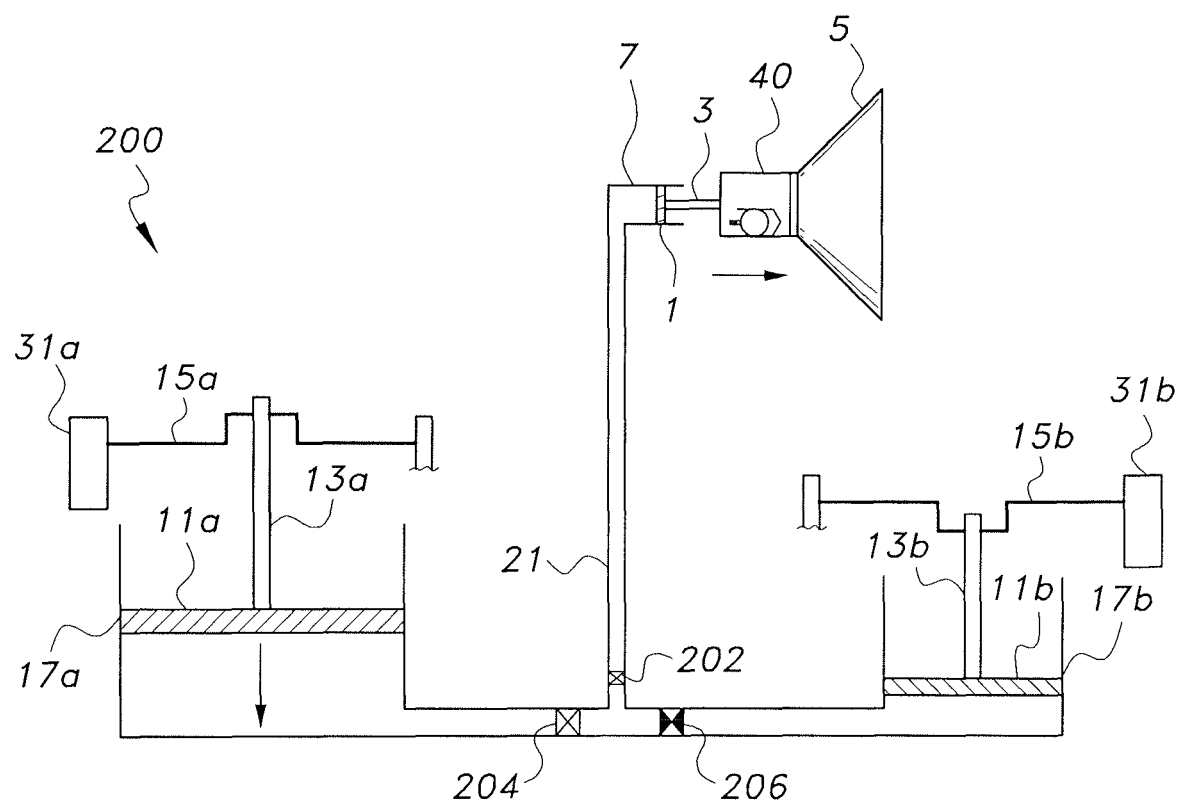
FIG. 9C is a diagrammatic side view of the multi-piston bladeless wind turbine of FIG. 9C, shown in a third, final stage of the stroke cycle.

In a further alternative embodiment, the sealed hydraulic system of the multi-piston bladeless wind turbine 200 of FIGS. 9A-9C is formed from an input cylinder 7, a plurality of output cylinders 17a, 17b, and a conduit 21 extending between the input cylinder 7 and the plurality of output cylinders 17a, 17b. As in the previous embodiments, an input piston 1 is constrained to reciprocate in and seal the input cylinder 7. The input piston 1 has an input shaft 3 extending therefrom and out of the input cylinder 7. For each output cylinder 17a, 17b, a corresponding output piston 11a, 11b is constrained to reciprocate in and seal the output cylinder 17a, 17b. Each output piston 11a, 11b has an output shaft 13a, 13b, respectively, extending therefrom and out of the corresponding output cylinder 17a, 17b. It should be understood that the plurality of output cylinders 17a, 17b and output pistons 11a, 11b may be used in combination with either the single input cylinder and piston embodiment, as described above with respect to the multi-piston bladeless wind turbine 100 of FIG. 1, or the previous multi-piston bladeless wind turbine embodiment, as described above with respect to FIG. 8. Although only two output cylinders 17a, 17b are shown, corresponding to the two pistons 11a, 11b and their respective shafts 13a, 13b, it should be understood that any desired number of output cylinders and corresponding pistons may be utilized.

As in the previous embodiments, hydraulic fluid 20 is disposed between the input piston 1 and each of the output pistons 11a, 11b. The wind disk 5, similar to the wind disk 5 of the previous embodiments, is attached to the input shaft 3, and, as in the previous embodiments, the wind disk 5 has a relief valve 40 selectively switchable between a closed position, in which full wind pressure is exerted against the input shaft 3, and an open position, in which at least some of the wind pressure is bled to the outside atmosphere. The sensor control system, similar to that of the previous embodiments, is connected to the relief valve 40 for switching the relief valve 40 between the open and closed positions in response to sensor signals relating to the position of the input piston 1 and/or each output piston 11a, 11b to maintain reciprocation of the input piston 1 and the output pistons 11a, 11b. As in the previous embodiments, the wind pressure against the wind disk 5 is converted to mechanical power by reciprocation of the output shafts 13a, 13b of the output pistons 11a, 11b. In FIGS. 9A-9C, individual generators 31a, 31b are shown connected to crankshafts 15a, 15b, which are respectively connected to shafts 13a, 13b. However, it should be understood that crankshafts 15a, 15b could, alternatively, be coupled to a single generator.

Additionally, a plurality of flow valves 202, 204, 206 may be provided for selectively controlling flow of the hydraulic fluid between the conduit 21 and the plurality of output cylinders 17a, 17b. As shown in FIG. 9A, valve 202 is positioned within conduit 21 prior to the branching of the fluid flow between the plurality of output cylinders 17a, 17b, valve 204 is positioned in the branch leading to output cylinder 17a, and valve 206 is positioned in the branch leading to output cylinder 17b.

In FIG. 9A, the wind is impinging on wind disk 5 to drive piston 1 to the left (in the orientation of FIG. 9A). In this initial configuration, valve 202 is open, valve 204 is closed and valve 206 is open. Thus, the hydraulic fluid is driven to flow only into output cylinder 17b to drive piston 11b upward, with no force exerted at this stage on piston 11a. It should be understood that control over valves 202, 204 and 206 may be automated, such as by using a control system similar to that described above, such that motion of the pistons may be monitored in order to sync opening and closing of the valves with respect thereto.

In FIG. 9B, valve 202 is closed and valve 204 is opened. In this stage, with flow restricted between output cylinders 17a and 17b, piston 11b falls and drives the hydraulic fluid to raise piston 11a. As shown, the cross-sectional surface area of output piston 11a may be larger than that of output piston 11b, thus amplifying the force applied to output piston 11a during this stage. FIG. 9C shows the final stage in the system's single stroke, with valve 202 being reopened and valve 206 being closed. This prevents the hydraulic fluid from flowing back into output cylinder 17b as piston 11a falls. The falling of piston 11a drives the hydraulic fluid back to input cylinder 7, where piston 1 is driven to move to the right (in the orientation of FIG. 9C).

It is to be understood that the multi-piston bladeless wind turbine is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A multi-piston bladeless wind power generator, comprising:
   a sealed hydraulic system having at least one input cylinder, at least one output cylinder, and a conduit extending between the at least one input cylinder and the at least one output cylinder;
   for the at least one input cylinder, a corresponding input piston constrained to reciprocate in and hydraulically seal the input cylinder, the input piston having an input shaft extending therefrom out of the corresponding at least one input cylinder;
   for the at least one output cylinder, a corresponding output piston constrained to reciprocate in and hydraulically seal the output cylinder, the output piston having an output shaft extending therefrom out of the corresponding at least one output cylinder;
   hydraulic fluid disposed between each the input piston and the output piston;
   a wind collector attached to the input shaft, the wind collector having a relief valve selectively switchable between a closed position in which full wind pressure is exerted against the input shaft and an open position in which at least some of the wind pressure is bled to outside atmosphere, wherein the wind collector comprises a frustoconical wind disk having a base, the base includes an open window defined therein, the relief valve comprising a gate linearly slidable between a position completely covering and closing the open window, thereby defining the closed position of the relief valve, and a position leaving the window at least partial uncovered for passage of wind therethrough, thereby defining the open position of the relief valve; and
   a sensor control system connected to the relief valve for switching the relief valve between the open and closed positions in response to sensor signals relating to position of at least one of the pistons to maintain reciprocation of the pistons;
   wherein wind pressure against the wind collector is converted to mechanical power by reciprocation of the output shaft of the at least one output piston.

2. The multi-piston bladeless wind power generator as recited in claim 1, further comprising:
   a linear-to-rotary actuator connected to the output shaft; and
   an electrical generator connected to the linear-to-rotary actuator, whereby reciprocation of the output shaft is converted to electrical energy.

3. The multi-piston bladeless wind power generator as recited in claim 2, wherein said linear-to-rotary actuator comprises a crankshaft.

4. The multi-piston bladeless wind power generator as recited in claim 1, further comprising a wind turbine mounted behind the window defined in the wind disk.

5. The multi-piston bladeless wind power generator as recited in claim 4, further comprising a mesh screen covering the window.

6. The multi-piston bladeless wind power generator as recited in claim 1, wherein said output piston has a greater surface area than said input piston.

7. The multi-piston bladeless wind power generator according to claim 1, wherein:
   said at least one input cylinder comprises a plurality of input cylinders, each of the input cylinders having a corresponding one of the input pistons constrained to reciprocate in and hydraulically seal the input cylinder, each of the input pistons having the input shaft extending therefrom out of the corresponding input cylinder, the input shafts being attached to said wind collector; and
   said at least one output cylinder consists of one output cylinder.

8. The multi-piston bladeless wind power generator according to claim 1, wherein:
   said at least one output cylinder comprises a plurality of output cylinders, each of the output cylinders having a corresponding one of the output pistons constrained to reciprocate in and hydraulically seal the corresponding output cylinder, each of the output pistons having the output shaft extending therefrom out of the corresponding output cylinder; and
   said at least one input cylinder consists of one input cylinder.

9. The multi-piston bladeless wind power generator according to claim 8, further comprising:
   a plurality of linear-to-rotary actuators, each of the output shafts being connected to a corresponding one of the linear-to-rotary actuators, respectively; and
   a plurality of electrical generators, each of the linear-to-rotary actuators being connected to a corresponding one of the generators, respectively, whereby reciprocation of each of the output shafts is converted to electrical energy.

10. The multi-piston bladeless wind power generator according to claim 9, wherein each said linear-to-rotary actuator comprises a crankshaft.

11. The multi-piston bladeless wind power generator according to claim 8, further comprising a plurality of flow valves disposed in the conduit for selectively controlling flow of the hydraulic fluid between the conduit and the plurality of output cylinders.

* * * * *